United States Patent [19]

Knutson et al.

[11] 4,129,937

[45] Dec. 19, 1978

[54] METHOD OF MAKING GROUNDED TRANSDUCER FOR MAGNETIC RECORD DISKS

[75] Inventors: Gerald R. Knutson; Karl A. Shidler, both of Rochester, Minn.

[73] Assignee: International Business Machines Corporation, Armonk, N.Y.

[21] Appl. No.: 827,530

[22] Filed: Aug. 25, 1977

Related U.S. Application Data

[62] Division of Ser. No. 698,235, Jun. 21, 1976, Pat. No. 4,058,846.

[51] Int. Cl.² .............................................. G11B 5/42
[52] U.S. Cl. ..................................................... 29/603
[58] Field of Search ................... 29/603; 360/118, 121, 360/122, 130, 103, 99

[56]  References Cited
U.S. PATENT DOCUMENTS 3,668,775   6/1972   Morita et al. ........................ 29/603
3,846,840  11/1974   Childers et al. ..................... 360/118

Primary Examiner—Carl E. Hall
Attorney, Agent, or Firm—Keith T. Bleuer

[57] ABSTRACT

A transducer particularly for use with magnetic record disks and composed of cores having transducing gaps therein adapted to contact or be in near contact with a record disk at the gaps and composed also of outriggers on the sides of the cores for increasing the surface area of the transducer adapted to contact or be in near contact with a record disk. The cores are of ferrite and have windings thereon, and the outriggers are of ceramic, both the ferrite and ceramic being nonconductive electrically. One of the outriggers is provided with a plating of electrically conductive material on a side surface with the plating being coterminous with the surface of the outrigger adapted to contact the record disk or be in near contact with it, and a ground lead is connected with the plating so as to ground any electrostatic charge on the surface of the disk.

5 Claims, 9 Drawing Figures

METHOD OF MAKING GROUNDED TRANSDUCER FOR MAGNETIC RECORD DISKS

This application is a division of U.S. Patent application Ser. No. 698,235, filed June 21, 1976, now U.S. Pat. No. 4,058,846.

CROSS REFERENCE TO RELATED APPLICATIONS

The invention in this application is related to those in the co-pending application of Norman E. Slindee for Magnetic Disk Drive Unit With Flexible Skirt, Ser. No. 615,944, filed Sept. 23, 1975 now U.S. Pat. No. 4,040,105 and in co-pending application of Coy L. Huffine et al for Antistatic Magnetic Record Disk Assembly, Ser. No. 615,943, filed Sept. 23, 1975 now U.S. Pat. No. 4,038,693.

BACKGROUND OF THE INVENTION

The invention relates to magnetic disk drives and particularly of the type adapted to accommodate disk-jacket assemblies. More particularly, the invention relates to mechanism for draining off accumulations of static electricity carried by the jacket and the disk of such an assembly.

Such disk-jacket assemblies have been previously proposed and are in current use. Such an assembly is described in the U.S. Pat. No. 3,668,658 issued June 6, 1972 to Ralph Flores et al. The assembly disclosed in this patent includes a magnetic disk which is contained and is rotatably disposed within a square jacket or cover. The jacket has a central opening for revealing a smaller central opening in the disk by means of which the disk can be driven, and the jacket contains two aligned radially extending slots through which a magnetic transducer may extend for the purpose of magnetically reading from or writing on a surface of the disk as the disk is rotatably driven.

High electrical resistance materials, such as polyvinyl chloride acetate, have been found particularly suitable for forming the jackets in such assemblies. The favorable characteristics of jackets formed with such materials are low-cost, resistance to impact, heat sealability for attaching parts of the jackets together to form a complete unit, etc.; however, jackets of such material have been found to accumulate static electricity due to normal handling. The disks in such assemblies are generally polyethylene terephthalate, also an insulator of high resistivity; and the static electricity also accumulates on the surfaces of the disks. Such accumulations of static electricity would provide spurious signals in transducers used with the disks as the static discharges; however, if the transducers are of an electrically conducting type, having their cores formed of iron, for example, these accumulations of static electricity are rapidly bled off so that they cause no trouble in ordinary usage of the disk-jacket assemblies. However, it has recently been found very advantageous to use magnetic transducers which are made completely of electrical insulating material. Such a transducer is disclosed in U.S. Pat. No. 3,846,840 issued Nov. 5, 1974 and includes ferrite cores having the transducing gaps therein and having windings disposed thereon for reading, writing or erasing information on the associated disk. Such a transducer also includes outriggers attached to the ferrite cores which are composed of ceramic material. The outriggers are used on the opposite sides of the cores for increasing the surface of the transducer that makes contact or has a close air bearing with the disk. Both the ferrite and the ceramic material are of electrically insulating nature and retard the bleeding off of the accumulated static charge on the jacket and magnetic disk for a very substantial time, such as 15 or 20 minutes. The disk drive thus is rendered incapacitated and unusable for this extended period of time.

SUMMARY OF THE INVENTION

It is an object of the present invention to provide, in connection with such a disk drive having a transducer of the type composed of electrically insulating materials, improved mechanism which functions to bleed off the static electricity accumulated on such a disk-jacket assembly as previously mentioned.

A preferred form of the invention includes a transducer having a ferrite core with the transducing gaps formed therin, ceramic outriggers fixed with respect to the core on the sides thereof, a plating on a side surface of one of the outriggers of electrically conductive material and terminating at the surface of the transducer adapted to contact the magnetic disk, and a ground lead connected with the plating so that the plating together with the ground lead quickly bleed off the static electricity carried by the disk-jacket assembly.

DESCRIPTION OF THE PREFERRED EMBODIMENTS

Figure 1:
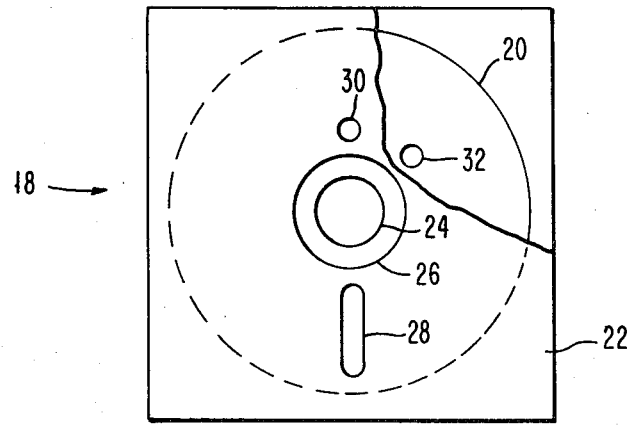
FIG. 1 is a plan view of a flexible magnetic disk forming an assembly with an enclosing envelope which may be used with the apparatus of the invention (the envelope is partially broken away for more clearly illustrating the magnetic disk therein)

Referring to FIG. 1 in particular, the magnetic disk assembly 18, which may be utilized by a disk drive including the magnetic heads and grounding apparatus therefor of the invention, may be seen to comprise a magnetic disk 20 disposed within a square envelope 22. The disk 20 is of a thin, flexible material, such as polyethylene terephthalate of about 0.003 inch thickness; and the disk 20 has an unoriented $Fe_2O_3$ coating on both sides. The envelope 22 may be of a more rigid, but still somewhat flexible, vinyl sheet material of 0.010 inch thickness, for example. The disk 20 has a central opening 24, and the envelope 22 has larger central openings 26 in its two thicknesses. In addition, the envelope 22 has aligned radial slots 28 and aligned round openings 30 in its two thicknesses. The openings 30 are adapted to align with an opening 32 in the disk 20 as the disk 20 rotates within the envelope 22. An assembly of this type is disclosed in U.S. Pat. No. 3,668,658, issued June 6, 1972, which may be referred to for more detail of the assembly.

Figure 2:
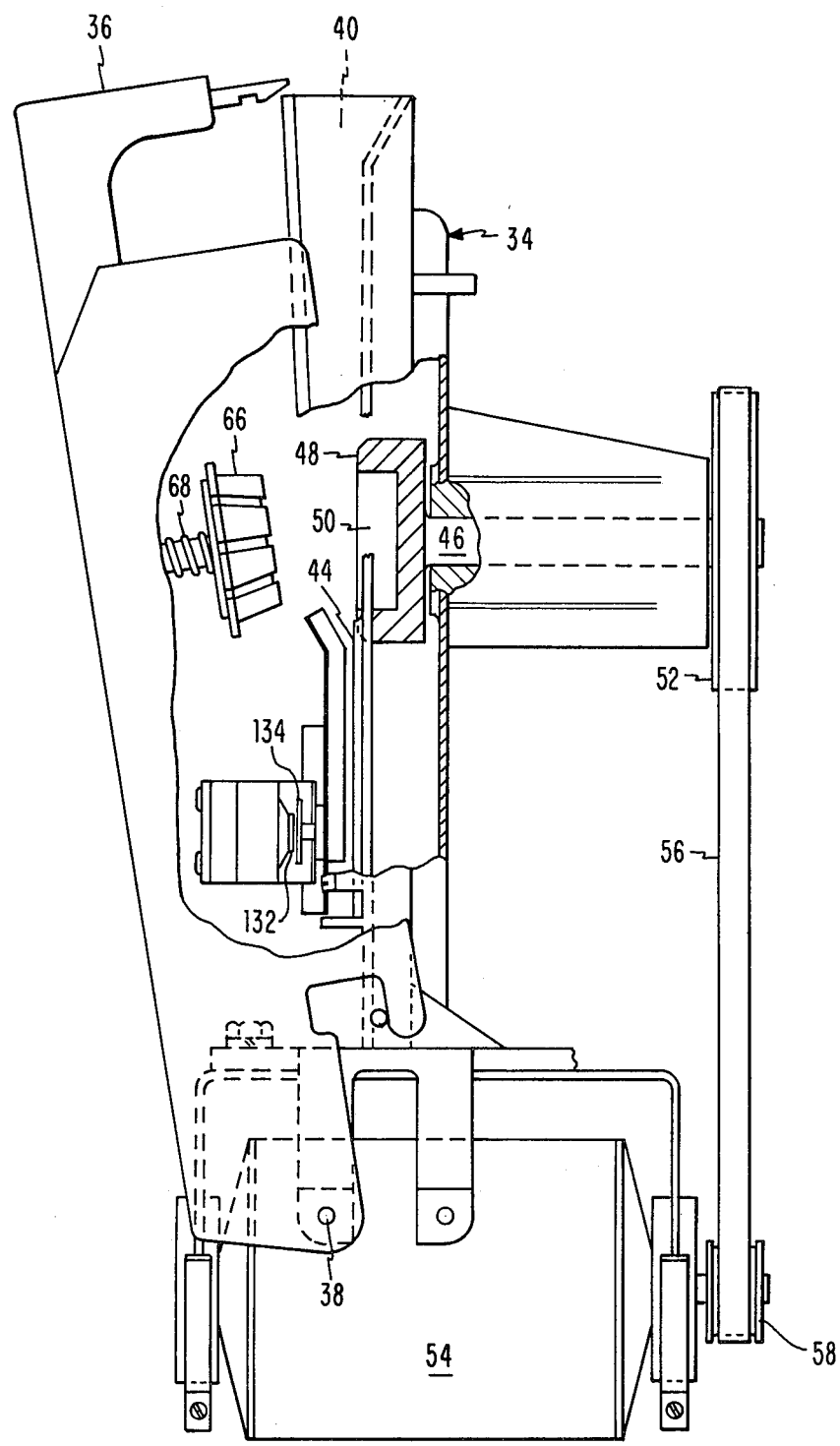
FIG. 2 is an end elevational view of a disk drive with which the invention may be used and including a swingable cover for shielding certain internal mechanism and for allowing an assembly as shown in FIG. 1 to be inserted into the drive.
Figure 3:
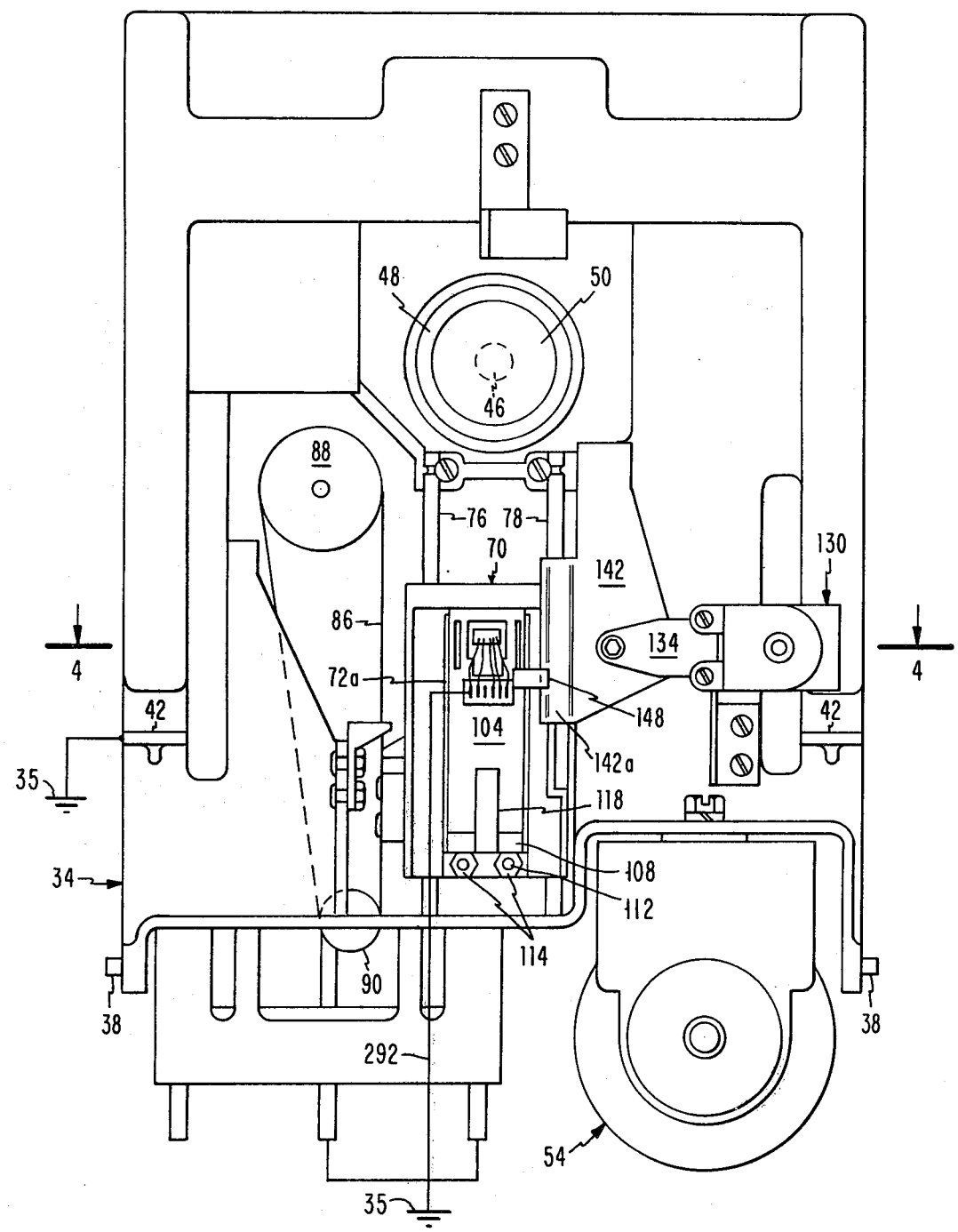
FIG. 3 is a side elevational view of the internal mechanism of the disk drive shielded by the cover and taken from one side of the main frame of the drive.
Figure 4:
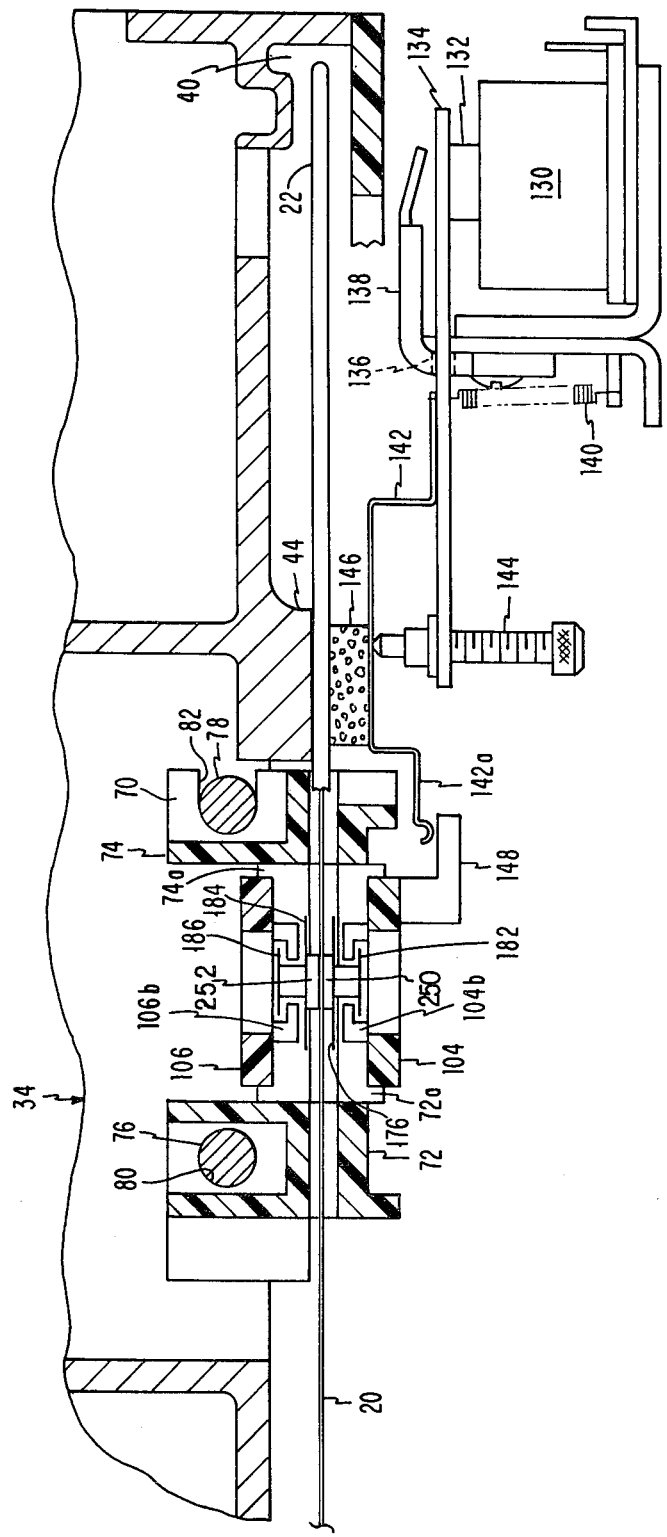
FIG. 4 is a sectional view on an enlarged scale taken on line 4—4 of FIG. 3.

A disk drive for use with the disk assembly 18 and which includes the improved magnetic heads and grounding apparatus of the invention is disclosed basically in FIGS. 2-4 hereof and is disclosed basically in greater detail in the co-pending U.S. patent application of Daniel O. Castrodale et al, Ser. No. 570,118, filed April 21, 1975 for Data Storage Apparatus Using A Flexible Magnetic Disk, which application may be referred to for greater detail of the disk drive. Referring to FIGS. 2-4, the disk drive may be seen to include a backbone or frame assembly 34 which as shown in FIG. 3 is connected to the ground 35 of the system using the disk drive. The frame assembly 34 has a cover 36 swingably mounted thereon by means of pivots 38 and is formed with downwardly tapering slots 40 for receiving a disk assembly 18. The frame assembly 34 is provided with a pair of stops 42 (see FIG. 3) on opposite sides for limiting the downward movement of the assembly 18 within the slots 40 and has a protruding platen portion 44 (see FIG. 4) for supporting a face of the envelope 22 as will be hereinafter described. A shaft 46 is rotatably disposed in the frame assembly 34 and is formed with a drive rim or flange portion 48 and with a central countersunk depression 50 in one end of the shaft 46. A pulley 52 is fixed on the other side of the shaft 46, and the pulley 52 is driven from a drive motor 54 located on the bottom of the frame assembly 34, the drive being by means of a belt 56 which extends around the pulley 52 and around the output pulley 58 of the motor 54.

The cover 36 has a tapered collet 66 rotatably mounted therein and loaded by a spring 68, and the collet 66 is adapted to enter the countersunk depression 50 in the end of the shaft 46 when the cover 36 is swung toward the frame assembly 34 so as to capture a disk 20 between the collet 66 and rim 48 for driving the disk. Any suitable latching means may be used for holding the cover 36 in closed disposition clamping a disk 20 between the collet 66 and the rim 48.

A carriage 70 is slideably disposed in the frame assembly 34 in such a manner as to move toward and away from the center of shaft 46. The carriage 70 embraces the disk assembly 18 resting on the stops 42 and has one part 72 on one side of the disk assembly 18 and has a second part 74 fixed with respect to the part 72 and disposed on the other side of the disk assembly 18. A pair of guide rods 76 and 78 are fixed with respect to the frame assembly 34 and extend through openings 80 and 82 in the part 74 for guiding the carriage 70 radially respect to the center of the shaft 46. Carriage 70 may be moved radially with respect to shaft 46 by means of a flexible steel band 86 that extends around a drive pulley 88 and around an idler pulley 90. The band 86 is fixed with respect to carriage 70 by any suitable clamping means, and pulley 88 is driven from any suitable drive motor (not shown).

Swing arms 104 and 106 are respectively disposed within openings 72a and 74a in the parts 72 and 74. The swing arms 104 and 106 are connected with the carriage 70 by means of leaf springs, such as the leaf spring 108 for the swing arm 104; and the leaf springs are fixed with respect to the lower end of the carriage 70 by means of threaded bolts 112 and nuts 114. The swing arms 104 and 106 are yieldably moved together by means of leaf return springs, such as the leaf return spring 118 effective on swing arm 104.

An electromagnet 130 (see FIG. 4) is provided for swinging the arm 104 outwardly; and any suitable mechanical connection may be provided between the arms 104 and 106, such as that disclosed in said Castrodale et al application, for causing the arm 106 to swing outwardly at the same time as the arm 104. The electromagnet 130 has a core 132, and an armature 134 moves toward and away from the core 132. The armature 134 is in the form of a lever which is fulcrumed in an opening 136 in a standard 138 that is fixed with respect to the frame assembly 34. A spring 140 is provided between the standard 138 and the lever 134. A lever extension 142 of relatively thin flexible material is fixed at its base end to the lever 134, and an adjustment screw 144 is provided for adjusting the extension 142 with respect to the armature 134. The lever extention 142 carries a foam rubber pressure member 146 that is located opposite the platen portion 44 of the frame assembly 34. The lever extension 142 also has a shorter but elongate end portion 142a that is disposed beneath a hook 148 fixed to the outer surface of the swing arm 104.

Swing arms 104 and 106 respectively carry electromagnetic heads or transducers 250 and 252 which, together with the grounding means therefor, incorporate the principles of the invention. The transducer 250 is fixed with respect to the arm 104 by means of a leaf spring 176, and a load arm 182 is fixed with respect to the leaf spring 176. Hook portions 104b integral with arm 104 around load arm 182 for drawing transducer 250 out of engagement with disk 20 when arm 104 is swung outwardly with respect to carriage 70 by deenergization of electromagnet 130. Transducer 252 is mounted in a similar manner with respect to arm 106 using a leaf spring 184 corresponding to the leaf spring 176, and hook portions 106b overlying load arm 186 withdraw transducer 252 from engagement with disk 20 when arm 106 is swung outwardly away from disk 20. Further details of suitable mountings for transducers 250 and 252 with respect to arms 104 and 106 may be had by referring to said Castrodale et al application, Ser. No. 570,118.

Figure 5:
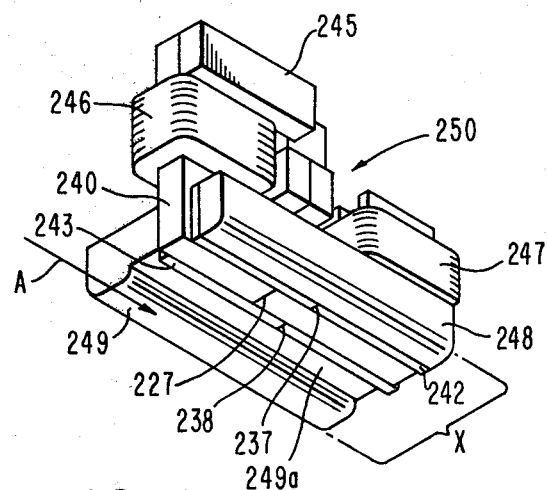
FIG. 5 is a perspective view of a magnetic head assembly embodying the principles of the invention and including an outrigger at the forefront of the figure which is plated with an electrically conductive material and is grounded in accordance with the teachings of the invention.
Figure 8:
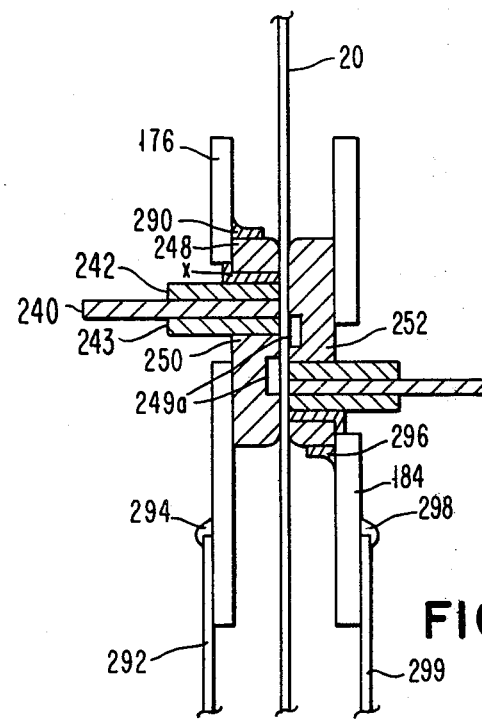
FIG. 8 is a sectional view of a pair of the magnetic head assemblies of the invention disposed opposite each other and on opposite sides of the disk of the FIG. 1 assembly.

The magnetic transducer 250 is illustrated in FIG. 5 and on the left of the disk 20 in FIG. 8. The transducer 252 is identical with the transducer 250 but is simply turned through 180°. The transducers 250 and 252 are basically the transducer which is disclosed in U.S. Pat. No. 3,846,840, issued Nov. 5, 1974, but the transducers 250 and 252 have improved grounding devices for the disk 20.

The transducers 250 and 252 are suitable for reading and/or writing a track of magnetic information on disk 20 and for erasing the edges of the track as well as old information adjacent the edges of the newly written track after it is written. Referring to FIG. 5, the transducer 250 includes a read/write core layer 240 centrally disposed between outer erase core layers 242 and 243, with the base surfaces thereof having the read/write transducing gap 227 and the erase transducing gaps 237 and 238 respectively, being coplanar in transducer surface X which is that surface of transducer 250 that makes contact with disk 20 or may have a very thin air bearing with disk 20 for information transfer between transducer 250 and disk 20. A read/write coil 246 is disposed around the end leg of the read/write core, and a single erase coil 247 is disposed over the end legs of the pair of erase cores 242 and 243. The coils are energized by an appropriate current source which is well-known in the art. A sidebar 245 bridges the legs of the magnetic core of the middle layer so as to provide a low reluctance flux path through the read/write core. A sidebar is not needed across the legs of the erase cores, since sufficient flux is produced across the erase tranducing gaps by the erase coil 247 to erase the edges of the read/write track. Nonmagnetic outrigger portions 248 and 249 are secured to the outer sides of the erase cores 242 and 243, with the bases thereof being coplanar with the base surface X of the transducer assembly. The outriggers protect the erase cores from erosion and increase the bearing area of surface X, thus assuring a constant erase gap and uniform wear of the head assembly. The outrigger 249 has a longitudinal groove 249a therein, and this groove extends in the same direction A as the disk 20 moves across the transducer 250.

Figure 6:
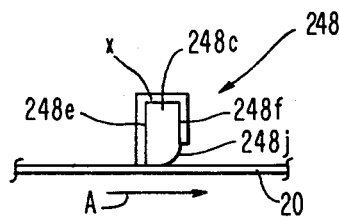
FIGS. 6 and 7 are respectively end and side views of the plated outrigger just mentioned.
Figure 7:
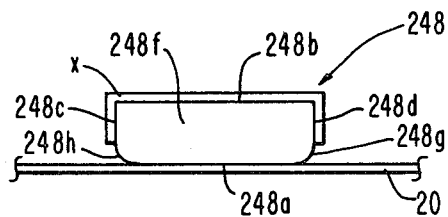

The outrigger 248 has a flat base surface 248a that extends parallel with disk 20 and is a part of surface X, an opposite outer surface 248b, end surfaces 248c and 248d and side surface 248e and 248f. The outrigger 248 is also formed with curved edge portions 248g, 248h and 248j. As will be observed from FIGS. 6 and 7 in particular, the surfaces 248b, 248c, 248d, 248e and 248f are provided with a layer or coating x thereon, and this is a plating of electrically conducting material, such as copper. The beveled corners 248g, 248h and 248j have no such layer thereon, but the conductive layer on the surface 248e extends all the way down to the transducer surface X that is in contact with disk 20 except possibly for the air bearing of minute thickness between the outrigger 248 and disk 20. The transducer 250 as seen in FIG. 8 is bonded with respect to the spring 176 by means of an adhesive body 290 which may be an electrically conductive epoxy to thus connect the coating x on the outrigger 248 to the spring 176. The spring 176 is of metal and thus electrically conducting and is connected by means of a flexible electrically conducting cable 292 to the ground 35 for the system with which the disk drive is used. Since both frame 34 and cable 292 are connected to ground 35, cable 292 is thus effectively connected to the frame assembly 34. The cable 292 is fixed by means of a body of conductive epoxy 294 to the spring 176. Since the corners 248g, 248h and 248j are rounded, the plating x on the surfaces 248d, 248c and 248f is not in close proximity to the adjacent surface of the disk 20 (see FIGS. 6 and 7), but the surface 248e of the outrigger 248 is internal in the transducer and is in contact with the ferrite core 242; and the layer x on this surface 248e ends and is coterminous with the plane of surface X that is lapped on the transducer 250 as will be described.

As previously mentioned, the transducer 252 is identical with the transducer 250 but is simply turned through 180°. The groove 249a in the transducer 252 is therefore out of line with the groove 249a in the transducer 250, as these transducers are illustrated in FIG. 8. The transducer 252 is bonded to the leaf spring 184 by a body 296 of conductive epoxy, and a body 298 of conductive epoxy connects the leaf spring 184 with a conductor cable 299. The conductive bodies 296 and 298 correspond to the conductive bodies 290 and 294 used for the transducer 250, and the cable 299 is similar to the cable 292 and is also connected to system ground 35 for grounding the electrically conducting coatings on the transducer 252 with respect to the frame assembly 34 in the same manner as the conducting coatings on the transducer 250 are grounded with respect to the frame assembly 34.

In the operation of the disk drive, the disk-jacket assembly shown in FIG. 1 is inserted into the slots 40. The cover 36 is then swung closed about its pivots 38 so as to clamp the disk 20 between the collet 66 and the drive rim 48. The motor 54 then functions to drive the disk 20 through the belt 56, and the transducers 250 and 252 are moved into contact (or very near floating contact) with opposite surfaces of the disk 20. The transducer gaps 227, 238 and 237, utilizing the coils 245 and 247, may then be used for either writing, reading or erasing on the disk 20, using the coils 246 ad 247 appropriately, as is well-known in the art.

As has been previously explained, a disk-jacket assembly 18 of the type shown in FIG. 1 and used in the disk drive accumulates static electricity due to normal handling; and this may be expected to occur before the disk-jacket assembly is inserted into the disk drive. This charge of static electricity could be expected to interfere particularly with reading information from the disk 20 for a substantial period of time, were it not for the grounding action provided by the electrically conducting coating x on the outrigger surface 248e and the grounding lead 292 connected thereto through the spring 176 (the grounding action of the transducer 252 is the same, utilizing the grounding lead 299). Since the outriggers 248 and 249 and the cores 240, 242 and 243 are all of electrically insulating material, they cannot provide a ground to the surface of the disk 20 for this action. Although apparently the charge on the assembly 18 is on the jacket 22, an opposite charge apparently accumulates on the disk 20 when it is inserted in the drive and is conducted to the transducer 252 by the rotation of disk 20 which is in contact with the coating x on the outrigger surface 248e so that the charge is quickly grounded with respect to system ground 35 and frame assembly 34 via the coating x and the ground lead 292.

The cores 240, 242 and 243 having the windings 245 and 247 thereon and having the transducing gaps 227, 237 and 238 therein are composed of an iron nickel zinc ferrite as mentioned in said U.S. Pat. No. 3,846,840. The ferrite is of electrically insulating material and is used in place of the prior used electrically conducting metal in transducers, because such ferrite heads are less costly and provide better reading response. The outriggers 248 and 249 are the baria titania ceramic mentioned for the outriggers in U.S. Pat. No. 3,846,840, and this material is also electrically insulating. This ceramic material is used for the outriggers 248 and 249 for two reasons: (1) the ceramic has the same lapping rate as the ferrite and (2) the ceramic has substantially the same thermal coefficient of expansion as the ferrite of the cores 240, 242 and 243.

The surface X of the transducer 250 adapted to contact the disk, including the surface 248a of the outrigger 248, is lapped so as to be accurately planar. This is important if the transducer 250 is to have a very intimate contact with the disk 20 as the disk 20 rotates, and this intimate contact is necessary if high density recording is to be attained. If the materials of the cores 240, 242 and 243 and of the outriggers 248 and 249 have different lapping rates, the surface X of the transducer 250 adapted to make contact with the disk 20 could not be lapped to be absolutely flat—hence it is important that the materials of the outriggers and of the cores have the same lapping rate. This is attained by making the outriggers 248 and 249 of ceramic, with the cores 240, 242 and 243 being ferrite.

As is explained in U.S. Pat. No. 3,846,840, the parts of the transducer there described are bonded together by glasses which must be heated to 600° centigrade to 700° centigrade in order that the glasses may melt and bond the parts of the transducer together. The transducers 250 and 252 are the same as the transducer described in this patent in this respect; and, if the materials of the cores 240, 242 and 243 and of the outriggers 248 and 249 did not have the same thermal coefficient of expansion, the glass bonds of these transducers would be broken as the transducer cooled after being heated for causing the glasses to flow between and bond the parts of the transducers together. Making the cores of ferrite and making the outriggers of ceramic satisfy this requirement, since the ceramic and ferrite have substantially the same coefficients of expansion. The glass is used particularly for bonding the cores 240, 242 and 243 together, and the glass exists in the gaps 238, 237 and 227 in particular. An epoxy cement may be used for fixing the outriggers 248 and 249 onto the cores 242 and 243 is desired; however, the same breakage would occur to the epoxy bonds as to the glass bonds if the coefficients of expansion of the materials of the outriggers and cores were not the same. There is still another reason why the thermal coefficients of expansion of all parts of the transducer 250 should be the same, and this is due to the fact that if the ferrite of the cores has a stress put on it due to unequal expansions, its magnetic permeability changes undesirably. In a practical application of the transducer 250, its temperature during usage, shipping and storage may change as much as 100° centrigrade; and such temperature change could cause a change in permeability if the outriggers and magnetic cores do not have substantialy the same coefficients of expansion.

In the manufacture of the transducer 250, the parts are all bonded together to form the complete transducer 250 as is shown in FIG. 5, with the glass and epoxy bonding holding the cores 240, 242 and 243 and the outriggers 248 and 249 together. The outrigger 248, prior to the assembly of the transducer 250 and prior to lapping of the transducer on its surface X contacting the disk 20 and including the surface 248a of the outrigger 248, has been plates with an electrically conductive metal on all surfaces. The transducer 250 is then lapped on its surface X adapted to contact the disk 20, and the surface X is made accurately flat by this lapping operation particularly since the lapping rate of the ceramic and of the ferrite are the same. The corners 248g, 248h and 248j are then rounded so that the outriggers do not tend to abrade the surface of the disk 20 on which the transducer is applied.

Figure 9:
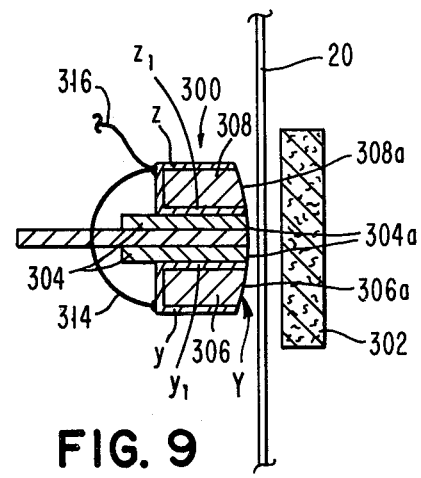
FIG. 9 is a sectional view of a modified magnetic head assembly and embodying the principles of the invention.

FIG. 9 discloses a modification of the invention and particularly a modified form of transducer 300 which is adapted to be used with a disk 20 that is supported by a felt pressure pad 302 positioned on the side of the disk 20 opposite that on which the transducer 300 is positioned. A disk drive of this type is disclosed in U.S. Pat. No. 3,846,836 issued Nov. 5, 1974, and the transducer 300 and pressure pad 302 respectively correspond with the transducer 124 and the pressure pad assembly 128 in the disk drive of U.S. Pat. No. 3,846,836.

The core assembly 304 of transducer 300 may correspond with the core assembly of transducer 250 including the cores 242, 243 and 240; and the transducer 300 has two outriggers 306 and 308 on the opposite sides of the core assembly 304. The outrigger and transducer surfaces 304a, 306a and 308a that are adjacent the disk 20 and are opposite the pressure pad 302 together form a spherical surface Y opposite pad 302. The other surfaces of the outriggers 306 and 308 are plated with electrically conductive layers y and z respectively, and an electric lead 314 connects the conductive layers on the two outriggers 306 and 308. A ground wire 316 is connected to the plating z on the outrigger 308 and is grounded to system ground 35 in the same manner as is the lead 292 of the previously described embodiment.

The grounding action by the electrically conducting coatings y and z on the outriggers 306 and 308 is substantially the same as described in connection with the transducer 250. The transducer 300, however, differs from the transducer 250 in that the transducer 300 has the surfaces 308a, 304a and 306a which compositely form spherical surface Y so as to accommodate to the relatively soft pressure pad 302. The surfaces 308a, 304a and 306a are lapped to have this spherical shape, and it is important if the shape is to be accurately spherical that the outriggers 308 and 306 be of ceramic so as to have the same lapping rate as the ferrite of the core 304. The outriggers 306 and 308, like the outrigger 248, are initially plated on all of their surfaces; and the lapping of the surfaces 308a and 306a removes the plating from the outriggers 308 and 306 on these surfaces. The plating remains on the other surfaces of the outriggers 308 and 306, and the ends of the plating layers y and z are coterminous, on the same spherical surface Y with the surfaces 308a, 304a and 306a. The disk 20 may curve slightly around the transducer 300 due to the action of the felt pad 302; nevertheless, the surface of the disk 20 can be expected to be in contact with at least one of the two conductive layers $z_1$ and $y_1$ on the transducer 300 which are coterminous with the arcuate surface Y and are next to the core assembly 304. The plated layers on the outriggers 306 and 308 are grounded by the lead 316, and the plated layers on the outriggers 308 and 306 thus rapidly conduct off any accumulations of static electricity on the disk-jacket assembly 18 in the same manner that the plated layer x on the outrigger surface 248e is effective for the transducer 250.

We claim:

1. In a method of making a magnetic head assembly, the steps which comprise, making a ferrite core having a transducer gap in a working surface of the ferrite core, making an outrigger of ceramic material, plating the outrigger on at least a pair of contiguous surfaces thereof with a layer of electrically conducting material, bonding said outrigger to said ferrite core with one of said plated surfaces being disposed between the ferrite core and said outrigger and with the other of said plates surfaces forming a continuation of said working surface of said ferrite core, and lapping said working surface of said ferrite core and the continuation thereof provided by said outrigger so as to form an accurate working surface of the magnetic head assembly and to remove the plating on said surface of said outrigger forming a continuation of said working surface of said ferrite core leaving the conductive plating between said ferrite core and said outrigger which may provide a conductive path for static electricity carried by a magnetic medium contacting or lying in close proximity to said working surface.

2. A method of making a magnetic head assembly as set forth in claim 1, said working surface being a planar surface and said lapping being conducted to make said surface accurately planar.

3. A method of making a magnetic head assembly as set forth in claim 1, said working surface being spherical and said lapping being conducted to render said surface accurately spherical.

4. In a method of making a magnetic head assembly for use with a moving magnetic medium, the steps which comprise:
   making a core member of magnetic and electrically non-conductive material having a transducer gap in a working surface of the core member,
   making an outrigger member of electrically non-conductive, non-magnetic material also having a working surface,
   plating one of said members with a layer of electrically conducting material on at least a pair of contiguous surfaces thereof and including its said working surface,
   bonding said members together with one of said plated surfaces being disposed between said members and with said working surfaces forming a continuation of each other, and
   removing a thin layer of said working surfaces of said core member and said outrigger member so as to form an accurate working surface of the magnetic head assembly and to thereby remove the plating on said working surface of said member having the plating leaving the conductive plating between said members which may provide a conductive discharge path for static electricity carried by a moving magnetic medium contacting or lying in close proximity to said working surface of the magnetic head assembly.

5. The method of making a magnetic head assembly as set forth in claim 4, in which the plating is accomplished on said core member which is electrically non-conductive and non-magnetic, said removal of a this layer of said working surfaces being accomplished by an abrading operation.

* * * * *

UNITED STATES PATENT AND TRADEMARK OFFICE
CERTIFICATE OF CORRECTION

PATENT NO. : 4,129,937
DATED : December 19, 1978
INVENTOR(S) : Gerald R. Knutson and Karl A. Shidler It is certified that error appears in the above-identified patent and that said Letters Patent are hereby corrected as shown below:

Column 8, line 62, cancel "plates", and insert --plated--.

Column 10, line 22, cancel "this" and insert --thin--.

Signed and Sealed this

Seventeenth Day of July 1979

[SEAL]

Attest:

LUTRELLE F. PARKER

*Attesting Officer*   *Acting Commissioner of Patents and Trademarks*